Patented Feb. 20, 1945

2,370,114

UNITED STATES PATENT OFFICE 2,370,114

MANDELIC ACID ESTER OF N-METHYL-PIPERIDINOL-4

Carl J. Klemme, Bronxville, and Richard Baltzly, New York, N. Y., assignors to Burroughs Wellcome & Co. (U. S. A.) Inc., New York, N. Y., a corporation of New York No Drawing. Application January 29, 1943, Serial No. 473,960

1 Claim. (Cl. 260—294)

This invention relates to a mydriatic which is useful as a substitute for homatropine or its salts and to a method of making the same.

An object is to provide a novel and improved substance of the above type and a method of making the same from readily available substances.

Other objects and advantages will be apparent as the nature of the invention is more fully disclosed.

In accordance with the present invention we have found that the mandelic acid ester of N-methylpiperidinol-4 and its salts having the formula

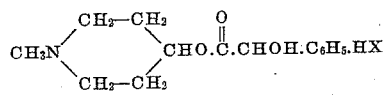

possesses desirable mydriatic properties and is suitable for use as a substitute for homatropine or its salts.

This ester may be prepared by esterifying N-methylpiperidinol-4 with mandelic acid as follows:

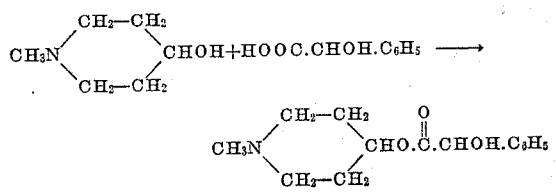

N-methylpiperidinol-4 and mandelic acid may be reacted in dilute acid solution. The solution may then be alkalized and extracted with a water immiscible solvent. The solution may be reacted with a soluble acid to form the desired salt of the above ester. After purification the base can be isolated.

Various salts of N-methylpiperidinol-4 may be used in preparing the material such as the hydrochloride, sulphate, phosphate, oxylate, tartrate, malate, succinate, etc. The corresponding salt of the ester may be used or the base may be obtained therefrom.

As a specific example N-methylpiperidinol-4 hydrochloride and mandelic acid may be reacted in warm 10% hydrochloric acid for a sufficient time to form the ester. The solution may then be diluted with water and extracted with ether to recover mandelic acid. The aqueous layer may be made alkaline with sodium carbonate and extracted repeatedly with ether. The ethereal solution may be dried over potassium carbonate and treated with gaseous hydrogen chloride, to precipitate the hydrochloride of the base as a syrup which may be crystallized from aqueous acetone and ether.

A specific example has been given only as an illustration. Modifications may be made as will be apparent to a person skilled in the art.

What is claimed is:

A compound selected from the group consisting of the mandelic acid ester of N-methylpiperidinol-4 and its salts prepared for use as a mydriatic.

CARL J. KLEMME.
RICHARD BALTZLY.